March 4, 1958

R. L. GREENE ET AL 2,825,686

ELECTRICAL COALESCENCE PROCESS

Filed Oct. 29, 1953

Robert L. Green
Arthur K. Scott    Inventors

By W. O. J. Heilman  Attorney

United States Patent Office 2,825,686
Patented Mar. 4, 1958

2,825,686

ELECTRICAL COALESCENCE PROCESS

Robert L. Greene and Arthur K. Scott, Westfield, N. J., assignors to Esso Research and Engineering Company, a corporation of Delaware Application October 29, 1953, Serial No. 388,946

3 Claims. (Cl. 204—190)

The present invention relates to an improved electrical coalescence process and apparatus therefor. The invention is more specifically concerned with an improved arrangement of electrodes for the breaking of oil emulsions, as for example, aqueous oil emulsions. A special adaptation of the present invention relates to an improved process and apparatus for treating hydrocarbon oils to remove foreign substances therefrom, as for example, for the removal of salt from fluid hydrocarbon streams containing the same. The invention is especially concerned with an improved method of electrical desalting wherein the arrangement of electrodes and the flow of the fluid stream being desalted are controlled in a critical manner to secure increased potential per unit of spacing as the fluid hydrocarbon passes through the electrical field.

In accordance with the present invention, a hydrocarbon stream containing salt is chemically treated, emulsified and passed through a zone in which it is subjected to the effect of an increasing potential of electrical field per unit of spacing for improved efficiency of coagulation.

It is well known in the art that various petroleum crudes contain salts and other deleterious substances in various concentrations. These salts comprise magnesium chloride, calcium chloride and sodium chloride. Among other metals present are iron, strontium, potassium and vanadium. Their salts may be present as the bromides, the sulfates, the carbonates and the bicarbonates. It is necessary that these salts be removed from crudes or at least reduced to a large extent since the salts not only cause corrosion of the refining equipment but also plug equipment, as for example, heat exchangers, condensers and the like. While sodium chloride usually is present in the largest concentration, the magnesium chloride and the calcium chloride apparently cause the greatest amount of corrosion and resultant damage of the refining and distillation equipment. It is thus known to remove these objectionable salts by various procedures.

One conventional method employed is to add water to the crude containing these salts and to heat the mixture to an elevated temperature, as for example to about 300° F. The heated stream is maintained at an elevated pressure, as for example, of about 200 lbs. In a desalting operation of this character in order to secure excellent contact between the water and the salt in the crude, it is necessary to secure complete mixing of the water and the crude oil which results in the formation of an emulsion of the oil and water. The mixing may be secured by any means but is usually accomplished by passing the stream through a pressure reducing valve or equivalent. The resulting emulsion is usually passed through a bed of coagulation material which generally comprises sand. The stream is subsequently passed to a settling zone wherein the water and oil segregate. The water phase containing the salt is withdrawn from the bottom of the settling zone while the oil phase which is usually substantially free of salt is removed from the top of the settling zone. The extent to which the oil is freed of salt is to a large degree a function of the size of the equipment and the amount of water employed. Usually, in order to secure a satisfactory lowering of the salt content of the oil, it is necessary to employ relatively large equipment.

Various electrical processes have also been suggested. In general, these processes comprise adding water to the salt containing crude, heating the mixture to a temperature of about 250° F. at a pressure of about 200 lbs. and passing the stream through a pressure reducing valve or other mixing means to secure adequate mixing which results in emulsification. The emulsion is passed into a zone containing electrodes which maintain an electrical field between the same. Due to the effect of the electrical field, breaking of the emulsion results which permits the aqueous phase to segregate from the oil phase. The salt to a large extent associates itself with the water phase. While these processes have been satisfactory, it is necessary to employ relatively large equipment. In accordance with the present invention, employing a novel electrode design and arrangement, the potential is increased per unit of spacing as the liquid progresses and flows through the electrical field.

The present invention may be readily understood by reference to the drawings illustrating the apparatus employed therein.

Figure 1:
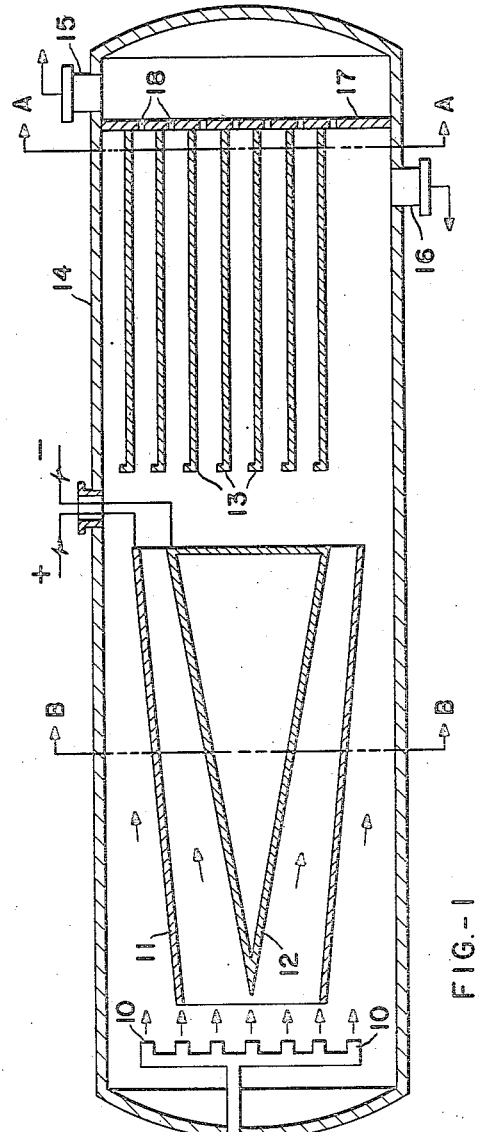
Figure 1 illustrates a coalescent zone constructed in accordance with the invention showing a side view of the electrodes and the coalescent surfaces.

Referring specifically to Figure 1, a feed oil to be desalted is introduced into the system by means of line 1, heated to the desired temperature in heating zone 2 and mixed with caustic which is introduced by means of line 3. A demulsifier is added to the oil by means of line 4.

Figure 2:
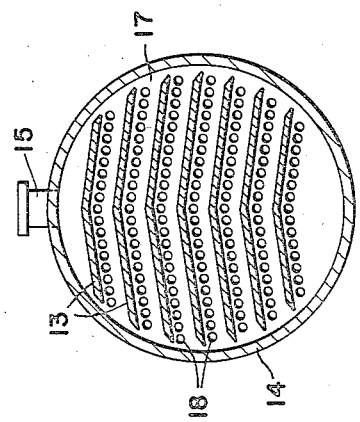
Figure 2 is a cross-sectional view of the coalescent zone of Figure 1 taken about the line A—A.

However, under certain circumstances it is preferable to add the demulsifier directly to the hot water stream. Hot water is added to the oil stream by means of line 5 and the entire mixture passed through a mixing zone 6. It is to be understood that the mixing zone preferably comprises a valve wherein the pressure is reduced in order to secure the desired turbulence and suitable mixing. The emulsion is withdrawn from zone 6 by means of line 9 and passed through nozzles 10 in order to jet the emulsion into an electrical field supplied by electrodes 11 and 12 within coalescent zone 14. A suitable voltage potential is maintained between the positive and negative electrodes 11 and 12 in order to secure breaking of the emulsion. The treated emulsion is withdrawn from the electrical zone and passed horizontally between coalescent surfaces 13. These coalescent surfaces comprise preferably chevron type structures, as shown in Figure 2. The desalted oil is withdrawn from the upper part of the desalting zone 14 by means of line 15. The aqueous layer containing the salt is withdrawn from the bottom of zone 14 by means of line 16. This brine solution may be further handled in any manner desirable to remove entrained oil particles.

The brine droplets which accumulate on the top of surfaces 13 flow outwardly along these surfaces and downwardly along the inner side of the drum. These droplets are collected in the lower area of the drum, and are removed by means of line 16.

A header element 17 (Figure 2) prevents the free flow of the respective streams between the coalescent elements 13. The header element has a plurality of openings 18 immediately below each coalescent surface. The number of openings between the respective surfaces is so adjusted as to secure a uniform pressure drop between all elements, thus insuring equal distribution of flow of the streams between the respective coalescent elements.

As pointed out heretofore, Figure 2 is a cross-sectional view of the coalescent zone of Figure 1 taken about the line A—A showing the chevron type coalescent surfaces, the end baffle 17 and the openings 18 in the end baffle immediately below the coalescent surfaces.

The electrical section of coalescent zone 14 has an anode 11, which is an elongated electrode of generally frusto-conical shape. Disposed within anode 11 is an elongated central cathode 12 of generally conical shape with its axis generally horizontal and with its apex directed toward the inlet end of the zone. The shapes of the cones are such that the distance between anode 11 and cathode 12 decreases in the direction of flow of the liquid.

Figure 3:
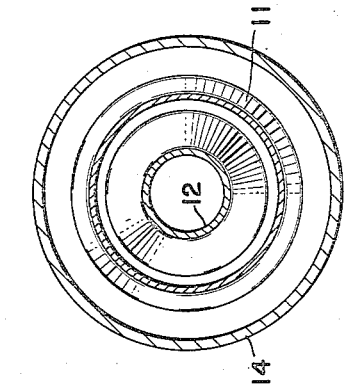
Figure 3 is a cross-sectional view of the coalescent zone of Figure 1 taken about the line B—B.

Figure 3 is a cross-sectional view of the electrical section of coalescent zone 14 taken about the line B—B. It can be seen from Figures 1 to 3 that the spacing between the electrodes decreases and the area of the electrodes increases in the direction in which the oil flows through the electrical section of zone 14. It is this electrode arrangement which gives increased potential per unit spacing as the fluid hydrocarbon passes through the electrical field.

Although the present invention has been described with its specific application to the desalting of a crude oil, it is broadly concerned with an improved electrical coalescence process and apparatus therefor. It may be adapted to the breaking of any emulsion, particularly aqueous emulsions. The invention is directed to a process wherein the feed stream is subjected to the effect of an electrical field and is subsequently passed to a distinct and separate settling zone. The particular pressures and temperatures employed in such an operation are dependent upon the character of the stream being treated, as well as upon the type and concentration of the dispersed substances present. As pointed out, the present invention is more broadly concerned with an electrical desalting operation wherein the electrical treating zone and the settling zone are separate and distinct areas, wherein chevron type coalescent surfaces are employed in the settling zone, and wherein the electrodes are so arranged so as to increase the potential per unit of spacing in the direction of fluid flow.

In accordance with the present invention, the oil to be desalted is treated with a neutralizing agent, as for example, with a caustic or carbonate solution. The oil is then contacted with a chemical de-emulsifying reagent and emulsified with water. It is preferred that the temperature of the water added be in the range of 150° F. to 250° F. preferably in the range from 190° F. to to 220° F. The chemical reagent may be any known de-emulsification material suitable for aiding emulsion breaking. The emulsion is passed through an electrical zone wherein it is subjected to the effects of an electrical field set up between electrodes arranged so that the potential per unit of spacing increases in the direction in which the oil flows. The voltage between the electrodes may be varied appreciably and may be in the range from about 5000 to 35,000 volts and higher; a desirable voltage is in the range of from about 16,000 to 20,000 volts. The respective phases flow from the electrical field and are passed to a settling zone.

The process involves emulsifying the feed stream which may comprise a crude oil or any refinery stream containing salt. The mixture of water and oil which may contain added chemicals is passed through a mixing zone, preferably a mixing valve or other equivalent means. However, the preferred method of mixing is to pass the stream through a differential pressure control valve resulting in the formation of an emulsion. The emulsion in order to break the same is introduced into a horizontal, preferably a cylindrical vessel containing electrodes operating at relatively high voltages. The emulsion flows horizontally between the electrodes and is subjected to the effect of the electrical field and is thus broken. The phases leaving the electrical field flow to a coalescent zone which is provided with parallel, closely spaced coalescent elements.

In essence, the process is conducted in two distinct stages which are specifically designed for distinct purposes. The electrical field stage is designed to efficiently subject the stream to the effects of the electrical field irrespective of settling requirements while the settling stage is designed to secure rapid and efficient settling irrespective of electrical field requirements.

The emulsification results from the extensive mixing of the respective phases which is necessary in order to secure the desired removal of the salt. As pointed out, various de-emulsification agents may be used, as well as agents for the adjustment of the pH value. One agent of the latter class is sodium hydroxide which is usually employed in a concentration which varies from about 0 to 15 lbs. of sodium hydroxide per thousand barrels of oil being desalted. The oil is usually heated to a temperature in the range from about 150° F. to 350° F. and maintained at a pressure in the range from about 25 lbs. to 300 lbs. per square inch. In accordance with the preferred adaptation of the present invention, the oil is heated to a temperature in the range from about 220° F. to 270° F., and maintained at a pressure in the range from about 100 lbs. to 250 lbs. per square inch gauge. The mixing is secured by passing the heated stream under pressure through a pressure-reducing valve or equivalent means so as to reduce the pressure thereon. It is desirable to have a pressure drop of from about 25 to 85 lbs. per square inch through the mixing valve. Obviously, if the feed stream contains a sufficient quantity of water, it may not be necessary to add additional water. A particularly desirable method of desalting a crude oil is to heat the same to a temperature of about 250° F. and to maintain the pressure on the stream at about 220 lbs. to 240 lbs. per square inch gauge. This stream is passed through a pressure reducing valve or equivalent means wherein the pressure is reduced, for example, to about 140 to 150 lbs. per square inch gauge.

By utilizing the particular electrodes of the present invention, unexpected desirable results are secured. In the first place, the use of such electrodes concentrates the electrostatic field and produces marked improvements in the coalescent action. Furthermore, the use of these electrodes eliminates the channelling of oil flow through the electrode zone. A very distinct advantage of the present invention is that the electrodes utilize the vessel cross-sectional area very efficiently.

What is claimed is:

1. In apparatus for breaking emulsions which comprises a horizontally disposed vessel, an emulsion feed inlet at one end of said vessel, and outlet for oil and an outlet for water at the opposite end of said vessel, a plurality of spaced-apart electrodes within said vessel adjacent said inlet, means for imposing electrical potentials of opposite polarity on adjacent electrodes, and a plurality of coalescent surfaces disposed within said vessel intermediate said electrodes and said outlets, the improvement which comprises an electrode arrangement including an elongated horizontally disposed central electrode and at least one additional electrode coaxially arranged with respect to said central electrode, said electrode arrangement being such that, in the direction away from said inlet and toward said coalescent surfaces, the spacing between adjacent electrodes decreases and the total effective area presented by the electrodes in a given vertical cross section increases.

2. An electrode arrangement as defined by claim 1 including an elongated central electrode of generally conical shape having its axis generally horizontal and its apex toward said inlet and a second electrode of generally frusto-conical shape surrounding said first electrode.

3. In a process for removing salt from a liquid hydrocarbon which includes the steps of emulsifying said hydrocarbon with water and flowing the resulting emulsion through an electrical treating zone where it is subjected to an electrical field and then to a settling zone wherein separation between water and oil is effected, the improvement which comprises applying said electrical field in said electrical treating zone by flowing said emulsion through an electrode arrangement providing decreased electrode spacing and increased total electrode area in the direction of fluid flow.

References Cited in the file of this patent

UNITED STATES PATENTS

| | | |
|---|---|---|
| 1,579,515 | Cason | Apr. 6, 1926 |
| 1,873,857 | Worthington | Aug. 23, 1932 |
| 2,033,137 | Fisher | Mar. 10, 1936 |
| 2,092,491 | Adams | Sept. 7, 1937 |
| 2,666,739 | Packie | Jan. 19, 1954 |
| 2,681,311 | Dewit | June 15, 1954 |

FOREIGN PATENTS

| | | |
|---|---|---|
| 680,244 | Great Britain | Oct. 1, 1952 |